No. 887,501. PATENTED MAY 12, 1908.
P. T. McNALLY.
ELECTRICAL CUT-OUT.
APPLICATION FILED JUNE 28, 1907.

3 SHEETS—SHEET 2.

WITNESSES
E. M. Callaghan
Edw. W. Byrn

INVENTOR
PHILIP T. McNALLY
BY Munn & Co.
ATTORNEYS

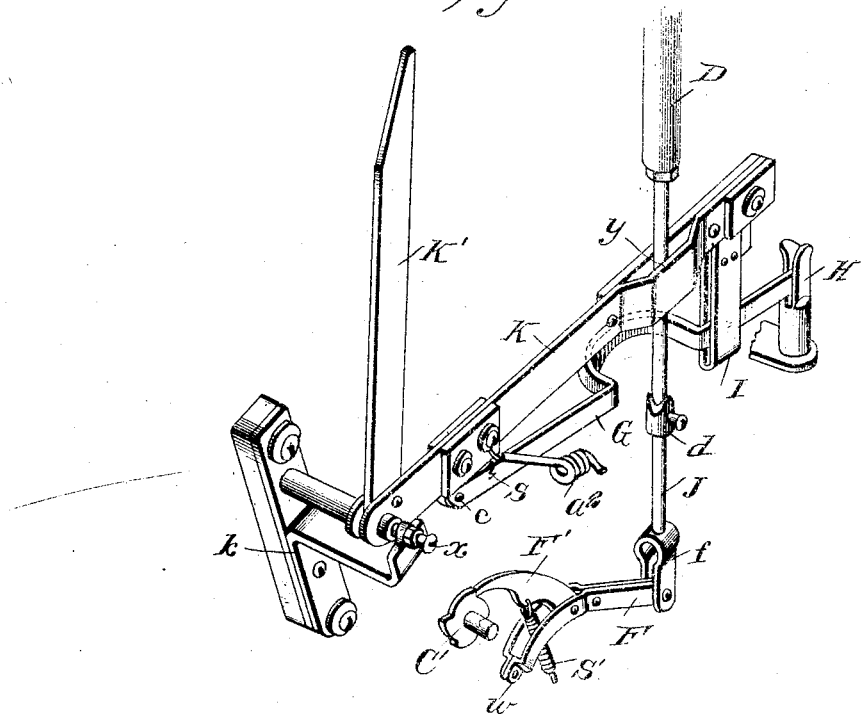

UNITED STATES PATENT OFFICE.

PHILIP THOMAS McNALLY, OF MANDAN, NORTH DAKOTA.

ELECTRICAL CUT-OUT.

No. 887,501.	Specification of Letters Patent.	Patented May 12, 1908.

Application filed June 28, 1907. Serial No. 381,260.

*To all whom it may concern:*

Be it known that I, PHILIP THOMAS MC-NALLY, a citizen of the United States, residing at Mandan, in the county of Morton and State of North Dakota, have invented a new and useful Improvement in Electrical Cut-Outs, of which the following is a specification.

My invention is in the nature of a new device for operating at a distance electrical switches in branch lines of electric lamps whereby the current may be cut-in or cut-out in said branch lines either from the power house or any remote station, thus controlling the current on said branch lines without shutting off the current in the main line leads.

I have shown my device as operating on alternating current circuits, though it will work equally as well on direct current circuits, and is so intended.

Figure 1:
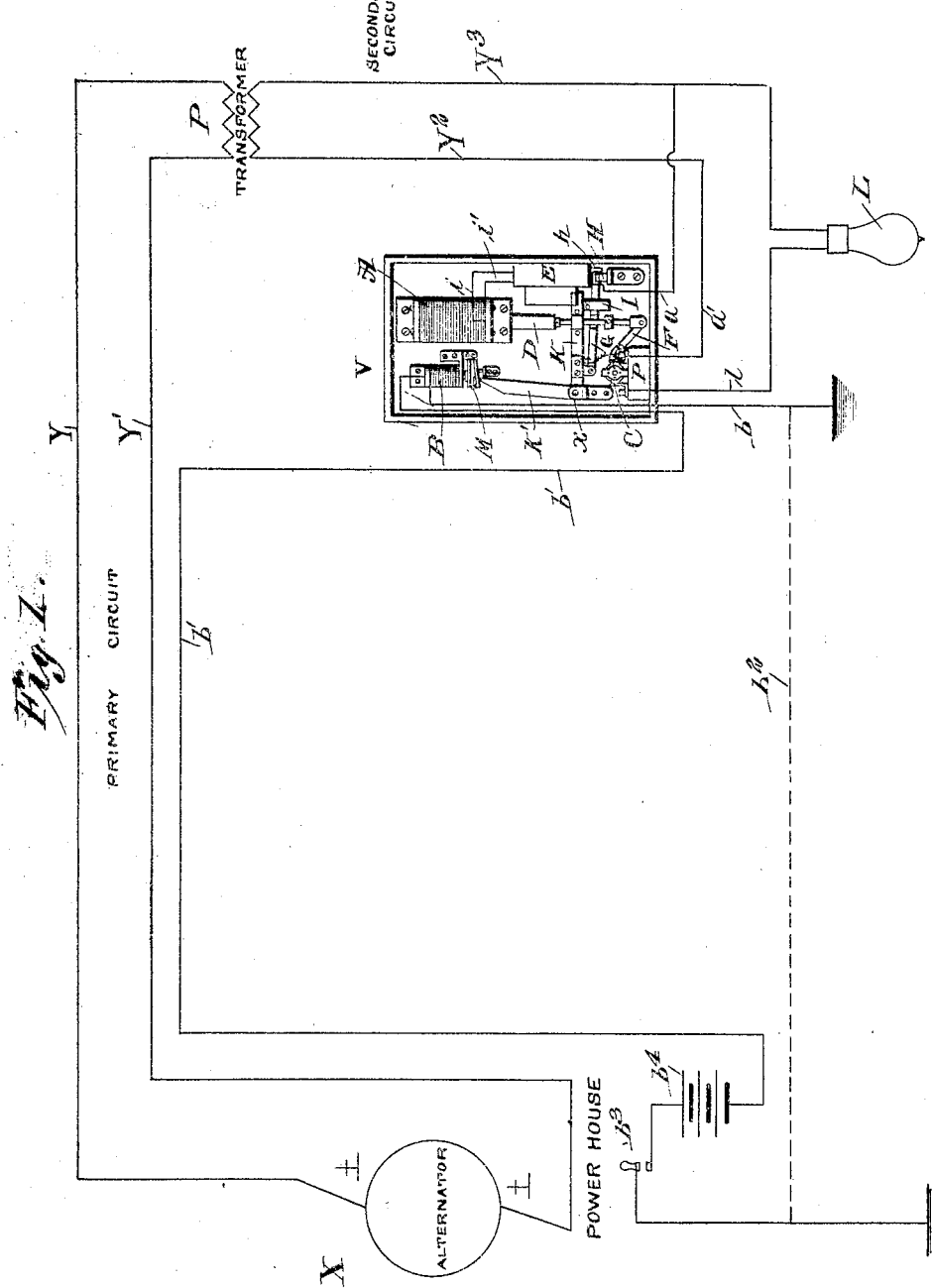
Figure 2:
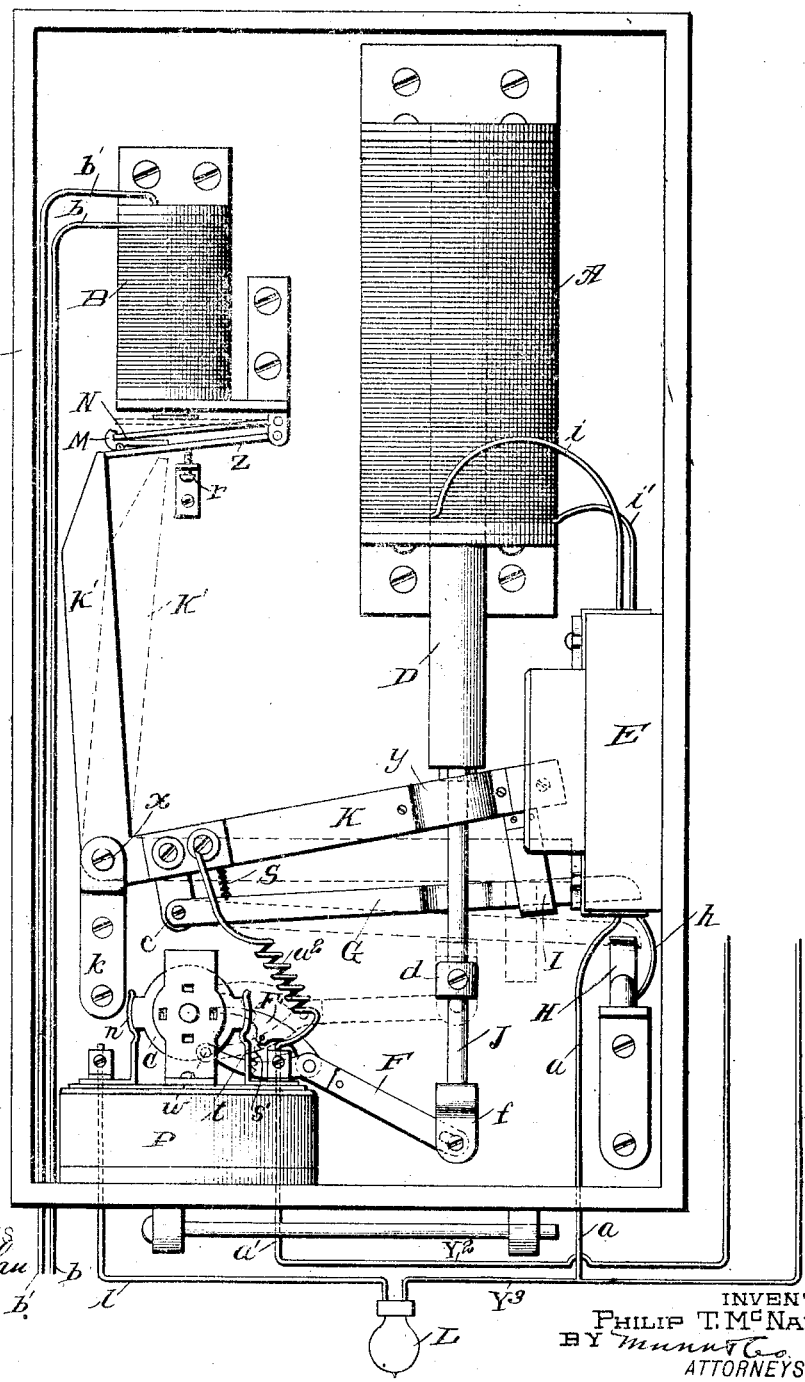

My invention relates to that form of cut-out devices in which a small circuit wire from the power house, or other control station, is extended to the cut-out device at a remote point to operate an electro-magnet therein to give the initial impulse for bringing into service other more powerful electro-magnetic devices for throwing the switch, and consists in the novel construction, arrangement of parts and circuits, which I will now proceed to describe with reference to the drawing, in which Figure 1 is a diagrammatic illustration of circuit leads, power house connections and branch circuit, with one of my cut-out devices shown in position in the branch circuit. Fig. 2 is an enlarged interior face view of the cut-out instrument. Fig. 3 is a perspective view of lower part, levers, etc., of the mechanism for cutting-in current to the solenoid, and plunger rod connection with lever of switch to be thrown. Said switch is here shown as a rotary pull switch. It will be understood, however, that any form of pull switch can be used with my device.

In the drawing, Figure 1, X represents an alternating generator of a power house station, from whose opposite brushes extend the line leads Y Y'.

Y² Y³ represent a branch circuit operated through a transformer and including any number of lamps L and one of my cut-out devices V through which this branch circuit is controlled from a distance.

Instead of lamps, as shown at L, it will be understood that motors or any other means for utilizing the current in the branch line are included within the scope of my invention.

At the power house, or control station, is located battery $b^4$ or any other source of electro-magnetic power. From one pole of the battery a small wire $b'$ leads to the cut-out device V and a return wire $b$ leads to the other side of the battery, either through the ground as shown, or through a return metallic circuit $b^2$, as shown in dotted lines. A circuit closing key or push button $b^3$ is located at the control station, through which the battery current is closed through the cut-out device.

Referring now to Fig. 2, B is an electro-magnet of a single coil which is in the circuit of the wires $b\ b'$ leading from the battery through the key at the control station, and which I term the initial control magnet. Beneath the electro-magnet is hinged an armature N, and hinged at the same end as the armature, is a trigger plate Z bearing on its top side near its free end a tilting and pivoted clutch latch M which is adapted to clutch and hold the armature, as indicated by solid lines, and thereby raise trigger plate Z, when magnet B is energized. Beneath the trigger plate Z is an adjustable stop screw $r$ which arrests the downward movement of the trigger plate Z and also serves to adjust the same vertically.

A is a solenoid for the alternating circuit, or direct current should the device be used on direct current circuits, and D is its core plunger playing vertically within the central opening of the solenoid and attached at its lower end to a rod J which through a coupling $f$ is loosely connected by a pin to the slotted end of the lever F of the rotary switch P of the usual construction. The lever F is fulcrumed at $w$ and has a pivoted pawl F' held down by a spring S'. When the lever F is raised, the pawl F' engages a 4-tooth ratchet C', Fig. 3, and this ratchet being rigidly attached to the rotary switch member C, Fig. 2, turns its diametrical contact faces alternately into and out of contact with the springs $n$ and $t$ connected to the branch line wires $a'$ and $l$. The upward movement of the plunger D lifts the lever F of the rotary switch P and alternately turns switch P to the "on" and "off" positions, which would be repeated indefinitely if there were not some checking device; this is one of the functions of trigger plate Z and its superimposed clutch and armature, which allows trigger plate Z to fall and reëngage K' of elbow lever K'—K after one predetermined movement of plunger D.

K'—K is a large elbow lever which is fulcrumed at $x$ to a bracket within the casing. The horizontal member K extends beneath the solenoid plunger D and incloses the rod J by means of a yoke $y$. The vertical member K' of the elbow lever K'—K extends up to engage with the trigger plate Z of the initial control magnet B, as indicated in solid lines, when the device is at rest, and is released by the energizing of magnet B and allowed to drop forward beneath the trigger plate, from the gravity of the horizontal members, as shown by dotted lines.

G is a shunt switch which is pivoted at $c$ to the under side of lever arm K and is also connected to it by a spring $s$ and plays at the other end through a pendent loop or stirrup I projecting downwardly from said lever arm. This switch lever G extends into range of engagement with spring jaws H forming a shunt terminal with which it is in electrical contact when down, as indicated by dotted lines, and from which it is separated when raised to the upper position by the locking of the vertical member K' of the elbow lever K'—K by the trigger plate Z, as shown by solid lines. This action of the trigger plate Z in engaging the vertical lever K' prevents the device from repeating.

From the solenoid coil A its two wires $i$ $i'$ extend first to the fuse block E and then connect, one of them through wire $h$ with the spring jaws H and the other through wire $a$ with the lead wire $Y^3$ of the branch circuit. A jumper $a^2$ extends from the wire $a'$ and the other lead $Y^2$ of the branch to the lever arm K and the shunt switch G, forming a shunt circuit in which the solenoid is placed.

On the plunger rod J is adjustably fixed a tappet or collar $d$ which is adapted to strike the lower edge of the yoke $y$ of the lever arm K and lifts it to the solid line position whenever the plunger core D is drawn up into the solenoid A after elbow lever K'—K has been released and allowed to fall into position of dotted lines. This collar does not strike against the shunt switch G, as the latter is bent laterally out of its path, as seen in Fig. 3. This is to allow the shunt switch G to remain down for some time in contact with the spring jaws H after the lever arm K has been raised by the collar $d$ and is to secure the turning of the switch P before the current is broken between G and H.

The operation of my cut-out is as follows: The elbow lever K'—K is in the position as shown by the solid lines, which is the position of rest, with its vertical arm caught by the trigger plate Z holding the horizontal arm K and the shunt switch G up and the latter out of contact with spring jaws H, so that there is no current through the solenoid A. If now it is desired to cut-in or cut-out the branch circuit $Y^2$ $Y^3$ from a remote station, as at the power house, key $b^3$ at the control station is closed. This energizes the electromagnet B and causes it to draw up the armature N and with it the trigger plate Z which is latched thereto by the pivoted clutch latch M. The trigger plate being lifted from in front of the lever arm K', the elbow lever K'—K drops forward from the weight of the horizontal arms, as shown by dotted lines in Fig. 2, and as it does so the shunt switch G is brought into contact with the spring jaw terminals H and current from the branch line is sent through the shunt circuit of the solenoid over the following path: from lead wire $a'$ and jumper $a^2$, lever arm K, shunt switch G, spring jaw contacts H, wire $h$, through one side of fuse block E, wire $i$, solenoid coil, wire $i'$, the other side of the fuse block E, and wire $a$ to the opposite side of the branch line. The result of the last described circuit will be, that the solenoid will be energized and will draw up its plunger core D and with it the rod J and the lever F of the switch P, turning said switch to the "on" or "off" position, as the case may be, and as the plunger D nears the completion of its ascent collar $d$ strikes lower side of lever arm K and lifts the shunt switch G out of contact with spring jaws H by means of stirrup I and spring $s$, thus breaking the solenoid circuit and allowing plunger D to drop to position shown in full lines and making one throw of the switch P, and at the same time resetting the vertical arm K' to the solid line position behind the trigger plate Z and thus preventing the circuit through spring jaws H from being reestablished until armature N is released by opening small wire circuit and falls to position of solid lines and again engages clutch latch M of trigger plate Z and magnet B is again energized.

The clutch catch M is of such construction that as soon as elbow lever K'—K is released, the clutch latch M is thrown off from engaging armature N and thus allows trigger plate Z to fall into position shown by solid lines and thus allows the reëngagement of the armature N with the clutch latch M, as shown by solid lines, when current in the electromagnet B is interrupted.

The object in having the shunt switch G independent of the initial upward movement of the lever arm K and having a drag connection with the same is to allow the plunger D time to throw the switch P before circuit through solenoid A is broken. If lever G were started up at the same time that lever arm K begins to rise the solenoid circuit would be made and immediately broken, but by giving the plunger D time to rise and do its work of throwing the switch P before the solenoid circuit is broken at H, this difficulty is obviated. For this reason I have termed the shunt switch bar G a "drag" switch, meaning thereby that it has a retarded motion, or a motion following after an interval has passed from the initial movement of the lever arm K.

From the foregoing, it will be seen that all the movements described produce but one throw of the switch P, that is, if the first cycle of movements closes the switch P, the next cycle will open switch P, and that one closure of the current through the electro-magnet B produces but one upward movement of the plunger core D of the solenoid A, and that a perfect control of my switch throwing device is in the hands of the operator at the control station.

I claim:

1. An electrical cut-out comprising a main switch, a solenoid with plunger for operating the switch, a branch circuit including the solenoid and having a branch switch, mechanical devices connecting the branch switch with the solenoid plunger, and a single controlling electro-magnet arranged in a wholly independent circuit and having an armature provided with a clutch and locking devices acting on the same mechanical devices which connect the solenoid plunger and branch switch.

2. An electrical cut-out, comprising an electro-mechanical device for turning-on and turning-off an electrical switch at a distance, a solenoid for same operated by a branch line current, a single electro-magnet for cutting-in said solenoid to said branch line, an armature for the electro-magnet, a trigger with trip clutch adapted to be engaged by the armature to lift the trigger, a drag switch held by the trigger and controlling the circuit of the solenoid, the whole forming means for preventing said solenoid device from making more than one turn-on or turn-off of said electrical switch for one closure of control circuit, no matter how long said control circuit may be kept closed.

3. An electrical cut-out, comprising a main switch, a solenoid in a branch line, an electro-mechanical device operated by the solenoid for turning-on and turning-off the switch, means for cutting-in current to the solenoid and for cutting-out current from said solenoid after its plunger has made a predetermined movement, a separate control circuit, an electro-magnet in said control circuit, and an armature, trip and latch for releasing the mechanism that cuts-in the current from branch line into said solenoid, and preventing the repeating of said electrical cut-out, no matter how long the control circuit may be kept closed.

4. An electrical cut-out, comprising a main switch, a solenoid in a branch circuit arranged to be thrown across the circuit in which the switch to be operated is located, an electro-mechanical device for throwing the switch, said electro-mechanical device being arranged to be operated by the plunger of the solenoid and having a branch switch member for cutting-in the solenoid to the branch circuit, and said branch switch member having a retarded drag connection to leave it in its closed position during the initial movement of the switch operating device and to move with it to open at the last part of the stroke, a trigger and trip mechanism for releasing said branch switch, an electro-magnet for the trigger and trip devices and a separate control circuit for said electro-magnet.

5. An electrical cut-out, comprising a main switch, a solenoid in a branch circuit arranged to be thrown across the circuit in which the switch to be operated is located, means for connecting the solenoid plunger with the switch to be operated, an elbow lever having one member acted upon by the plunger rod of the solenoid to lift it, a branch switch member having a drag connection with said elbow lever, allowing individual initial movement of said elbow lever and a movement together at the latter part of the stroke, a contact terminal for the branch switch member, a trigger and trip mechanism for the elbow lever, an electro-magnet controlling the same and a separate control circuit for said electro-magnet.

6. An electrical cut-out, comprising a solenoid in a branch circuit arranged to be thrown across the circuit in which the switch to be operated is located, a rod for the solenoid plunger bearing a tappet, an elbow lever arranged to be struck by said tappet, a branch switch member pivoted to said elbow lever, a pendent detaining loop connected to the elbow lever and inclosing the branch switch member for a retarded drag connection, a contact terminal for said branch switch member, a trigger and trip mechanism for the elbow lever, an electro-magnet for controlling the same and a separate control-circuit for said electro-magnet.

7. An electrical cut-out, comprising a solenoid in a branch circuit, a branch switch, an electro-mechanical device for operating the switch to be thrown and the branch switch, the solenoid having a plunger arranged to operate the electro-mechanical device, and a device for tripping the electro-mechanical device, consisting of a separate control circuit, an electro-magnet operated thereby, an armature, a subjacent trigger pivoted below the armature and having a clutch latch engaging the armature, said trigger being arranged to lock the electro-mechanical device and prevent repeating, and allow it to fall by the energizing of the control magnet.

PHILIP THOMAS McNALLY.

Witnesses:
　JNO. HESS,
　B. K. SKEILS.